United States Patent [19]

Gaines

[11] Patent Number: 4,779,525
[45] Date of Patent: Oct. 25, 1988

[54] SMOKE GENERATING DEVICE

[76] Inventor: Tom H. Gaines, 249 Senate NW., Salem, Oreg. 97304

[21] Appl. No.: 7,052

[22] Filed: Jan. 23, 1987

[51] Int. Cl.$^4$ ............................ A23L 1/01; A23B 4/04
[52] U.S. Cl. ........................................ 99/482; 99/467; 126/25 R; 126/59.5; 206/524.6; 206/525
[58] Field of Search ................ 99/467, 483, 482, 399, 99/340, 446, 419, 516, 480; 426/235, 314, 315; 126/25 R, 25 A, 59.5, 79; 131/329, 330, 185, 200; 110/108, 102, 118, 196; 206/525, 524.6

[56] References Cited

U.S. PATENT DOCUMENTS

| | | |
|---|---|---|
| 2,789,877 | 4/1957 | Pfundt . |
| 2,967,023 | 1/1961 | Huckabee . |
| 3,081,692 | 3/1963 | Sorensen . |
| 3,347,148 | 10/1967 | Williams . |
| 3,788,301 | 1/1974 | Terry .............................. 99/482 X |
| 4,130,052 | 12/1978 | Jacobson . |
| 4,140,049 | 2/1979 | Stewart . |
| 4,190,677 | 2/1980 | Robins . |
| 4,404,241 | 9/1983 | Mueller et al. .................... 206/524.6 |
| 4,436,100 | 3/1984 | Green ................................ 99/482 X |
| 4,462,307 | 7/1984 | Wells ................................ 99/482 X |
| 4,467,709 | 8/1984 | Anstedt . |

Primary Examiner—Timothy F. Simone
Attorney, Agent, or Firm—Klarquist, Sparkman, Campbell, Leigh & Whinston

[57] ABSTRACT

A smoke producing device for use in a barbecue or the like is disclosed comprising a smoke producing material, such as wood chips, enclosed in a noncombustible perforated container. The perforations are kept covered by a perforation cover until use so as to prevent leakage of the smoke producing materials from the container and to prevent the loss of moisture and volatile aromatic oils from the smoke producing material. This cover is preferably constructed of a combustible material so that when heated in a barbecue, it will ignite and burn off to expose the perforations, through which the smoke can then escape to flavor the food.

7 Claims, 1 Drawing Sheet

SMOKE GENERATING DEVICE

TECHNICAL FIELD

The present invention relates to smoking foods, and more particularly to an improved device for generating food flavoring smoke in a barbecue or the like.

BACKGROUND AND SUMMARY OF THE INVENTION

With the advent of charcoal briquets, gas fired barbecues and stove top grills, the natural smoke flavoring imparted to foods by traditional grilling methods, such as over smoldering wood coals, has been lost. Consequently, it has become desirable to be able to provide a natural wood smoke flavoring to foods cooked by these methods. Several unsatisfactory techniques have been proposed.

One prior art technique for imparting a smoke flavor to cooked meats and the like is to soak the food in a chemical flavoring agent.

This approaches suffer from a number of drawbacks. First is the natural concern of soaking an edible foodstuff in an unknown chemical agent. The risks associated with these chemicals are not yet fully known. A second drawback is that these chemicals sometimes act to draw out the food's natural juices to the surface, from which location they can drip to the barbecue or be consumed by fire. The loss of these natural juices dries out the food and sometimes alters its normal taste. A final drawback of the chemical approach is the attendant sacrifice in smoke flavor. Most smoke flavoring chemicals are entirely artificial. The flavor they impart bears little resemblance to the true wood smoke flavor being imitated. Even those chemical flavoring agents that are actually derived from wood products perform poorly because many of the desirable flavors obtained from wood smoking are formed when the aromatic agents within the wood are combusted. The chemicals used to treat the food are not combusted, as they are usually absorbed into the food and not heated to ignition. Consequently, even with "natural" liquid smoking agents, the desired traditional smoke flavor is not obtained.

An approach related to soaking the food in a chemical flavoring agent is to enclose the food in a casing formed from precipitate materials derived from these chemical agents. This approach also suffers from the above-recited drawbacks. Examples of this approach are shown in U.S. Pat. Nos. 4,446,167 and 4,442,868.

Yet another approach to imparting a smoke flavoring to cooking foods is to provide a packet of smoke producing material, such as wood flour, in a Kraft paper wrapper suspended above the coals of the barbecue. When the Kraft paper is ignited by the hot coals, the wood flour spills onto the coals and ignites, thereby producing smoke. U.S. Pat. 4,190,667 to Robins shows such a system.

Although an improvement over the chemical treatment methods, this Robins approach still suffers from several drawbacks. One is that the smoke is generated by the ignition of the wood flour. Such ignition consumes the entire material quickly and produces only a small amount of smoke. A second drawback is that the wood flour falls onto the coals all at once when the Kraft paper burns through. Accordingly, the smoke so generated is produced all at once and is not released continuously during cooking of the food. As a final drawback, the Kraft paper wrapper is moisture permeable, thereby allowing the wood flour material contained therein to dry out and lose much of its aromatic quality.

Still another approach to generating wood-flavored smoke is to add wood chips to the coals of a barbecue. The chips can be soaked in water to slow their combustion. Despite such precautions, the chips nonetheless are consumed quickly and the smoke produced therefrom is consequently of short duration. Furthermore, this technique cannot be used with devices such as gas fired barbecues or stove top grills because such devices might be damaged in the process.

A final prior art smoke producing system is shown in U.S. Pat. No. 2,967,023 to Huckabee. Huckabee uses a perforated aluminum bag that contains a smoke producing material such as wood chips. In use, the bag is placed on the coals, thereby heating the wood chips and causing them to smolder. The wood chips are not permitted to ignite because the perforations are too small to admit air sufficient to support combustion. As the chips within the bag smolder, smoke is emitted through the perforations.

Although an improvement over prior art methods, the Huckabee device still leaves substantial opportunities for improvement.

In order to overcome the numerous drawbacks found in the prior art, an improved device for producing smoke in a barbecue or the like has been devised.

It is one object of the present invention to provide a smoke generating device that limits exposure of the smoke generating material contained therein to the surrounding environment until the device is used.

It is another object of the present invention to prevent the loss of moisture from smoke generating material in a smoke generating device until the device is used.

It is still another object of the present invention to provide a smoke generating device in which smoke exhaust holes are automatically uncovered when the device is used in a barbecue or the like.

It is yet another object of the present invention to provide smoke generating device in which exposure of the smoke generating material to the surrounding environment is prevented by a sealing material that can be removed before the device is used.

These and other objects, features and advantages of the present invention will become more readily apparent from the following detailed description, which proceeds with reference to the accompanying drawings.

DETAILED DESCRIPTION

With reference to FIGS. 1-6, a smoke generating device 10 according to the present invention comprises an incombustible container 12 formed, for example, of aluminum foil, containing a smoke producing material 14. Smoke producing material 14 can be any of a number of different agents, such as wood chips, crushed almond shells, etc. This material is shown largely in cross hatch form in FIGS. 2, 4 and 6 for clarity of presentation.

Figure 1:
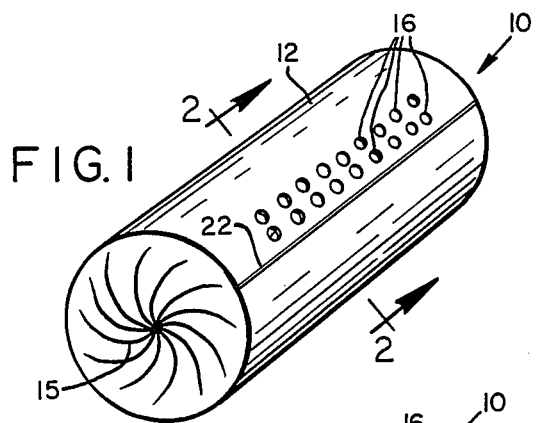
FIG. 1 is an isometric view of a smoke producing device according to the present invention before a perforation cover is added.
Figure 3:
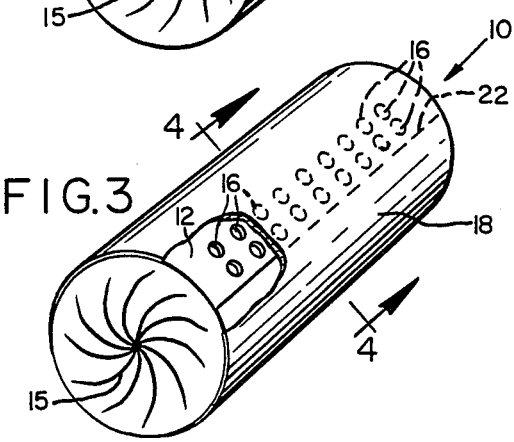
FIG. 3 is an isometric view of the smoke producing device of FIG. 1 showing the perforations occluded by one form of perforation cover.
Figure 5:
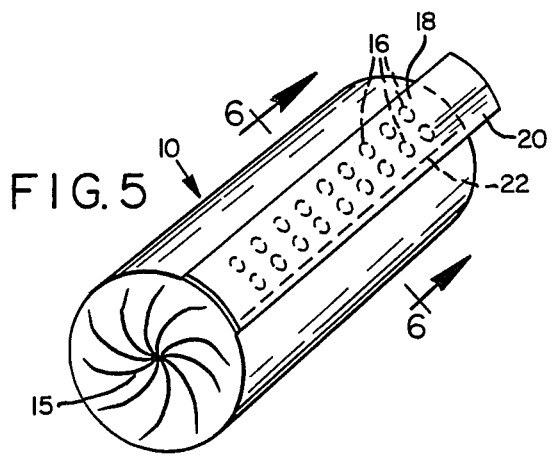
FIG. 5 is an isometric view of the smoke producing device of FIG. 1 showing the perforations occluded by another form of perforation cover.

In the preferred embodiment, device 10 is cylindrical in form, being rolled from aluminum foil and having its ends closed. The cylinder illustrated is one and one-eighth inch in diameter by two and a quarter inches long. It has been found that crimping the ends of the cylinder with a crimp 15 is an effective way to provide a substantially air-tight seal. The effectiveness of this seal can be enhanced if the crimps are twisted as they are being formed, as illustrated in FIGS. 1, 3 and 5. The illustrated device contains approximately one-half ounce of smoke producing material.

Container 12 includes at least one smoke exhaust hole 16 through which smoke can escape the container when smoke producing material 14 is heated to smoldering in a barbecue or the like. In the preferred embodiment, container 12 includes a plurality of holes 16 spaced in linear array along the container. In use, container 12 is positioned in the barbecue with these perforations oriented vertically so that the smoke will escape therethrough as it rises from the smoldering smoke producing material contained therein.

The placement of holes 16 on container 12 is important to proper operation. If the holes are not oriented vertically when the device is used, the rising smoke may not escape the package, thereby limiting its effectiveness. The rate of smoke emitted from the package is also dependent on the pattern of holes. If the holes are formed both at the top and near the bottom of the package, as the package is oriented for use in a barbecue, air is able to flow in through the bottom holes, up through the smoke producing material, and out through the top holes. The smoldering is thus accelerated. It is generally more desirable to provide holes only in the top of the package so that the rate of air flow through the container, and consequently the rate of smoldering, is limited.

The size of the holes is also crucial. If the holes are too large, sufficient air will enter to support combustion of the smoke producing materials, with a consequent decrease in the quantity and quality of smoke produced. Furthermore, flaming fat which falls from cooking meat may fall onto large holes and be allowed to enter the cylinder therethrough and ignite its contents. If, on the other hand, the holes are too small, not enough smoke will be released to flavor the food. A suitable compromise between these countervailing considerations is to use approximately eighteen holes one-eighth inch in diameter arrayed on the top surface of the device.

In order to prevent leakage of smoke producing material 14 from container 12 and to prevent the loss of moisture and volatile aromatic oils from the smoke producing material, a cover 18 (FIGS. 3-6) is provided in the present invention to cover perforations 16 until smoke generating device 10 is placed into service.

Figure 4:
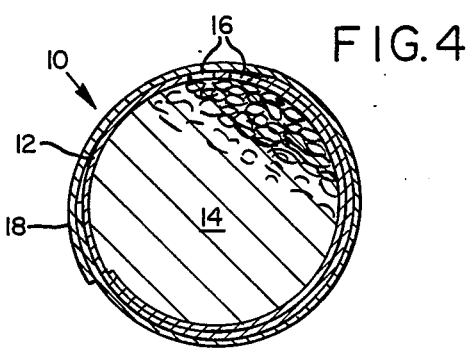
FIG. 4 is a sectional view taken along lines 4—4 of FIG. 3.
Figure 6:
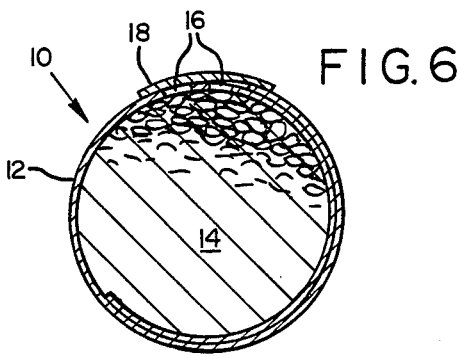
FIG. 6 is a sectional view of the device of FIG. 5 taken along lines 6—6.

According to one feature of the present invention, cover 18 can be formed of a combustible material so that it ignites and burns off to expose perforations 16 when the device is heated in a barbecue or the like. With reference to FIGS. 3 and 4, cover 18 can be formed to totally encircle container 12. Such covering can be effected by wrapping a material such as paper around the container or by forming a layer of wax on the device, such as by spraying or dipping. Alternatively, as shown in FIGS. 5 and 6, cover 18 can be formed of a narrow strip of combustible or meltable material designed to cover only perforations 16 and to leave the remainder of container 12 uncovered. In either event, cover 18 combusts or melts away from or the like.

According to another feature of the present invention, cover 18 can be removably fastened to container 12 so that it can be manually removed before the device is used. The cover 18 shown in FIGS. 3 and 4 can, for example, be formed with a paper wrapper that can be peeled off to expose the perforations on the device. Alternatively, as shown in FIGS. 5 and 6, cover 18 can comprise a narrow strip of material designed to cover only the perforations. In either event, one portion of cover 18, such as end 20 in FIG. 5, can be left free and not bonded to container 12 so as to provide a tab which can be grasped to remove the cover from the container.

It is of course desirable, when using a construction in which the cover is adhesively bonded to the container, that any bonding residue left behind after the cover is removed not produce an objectionable flavor when it is consumed in the fire. It has been found that common wax is such a suitable bonding agent that has the added benefit of being moisture impermeable while intact. Wax can be used, for example, both to bond an onion-skin-like paper or cigarette rolling paper around the cylinder and to make such paper moisture impermeable.

Similarly, if a combustible seal is provided, the material that combusts to expose the holes must also be selected so that it will not impart an objectionable flavor to the food. Cigarette paper and wax are suitable alternatives.

Figure 2:
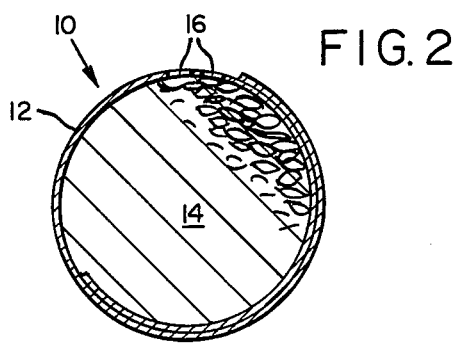
FIG. 2 is a section view taken along lines 2—2 of FIG. 1.

In the illustrated aluminum cylinder construction, an edge 22 of the aluminum foil is left on the outer surface of the device. Some exchange of moisture and aromatic oils may take place under this edge. This possibility can be minimized by encircling the cylinder with more than 360 degrees of foil (for example, the cylinders in FIGS. 2, 4 and 6 are illustrated as including 540 degrees of foil). To further minimize the effect of open edge 22, cover 18 can be positioned so as to cover it. In FIG. 3, cover 18 encloses the entire cylinder, including the edge 22. In FIG. 5, cover 18 can be sized so that it also covers opening 22. Perforations 16 can be formed during manufacturing so that they are adjacent edge 22 in order to facilitate closure of the associated air passageway with cover 18.

Figure 7:
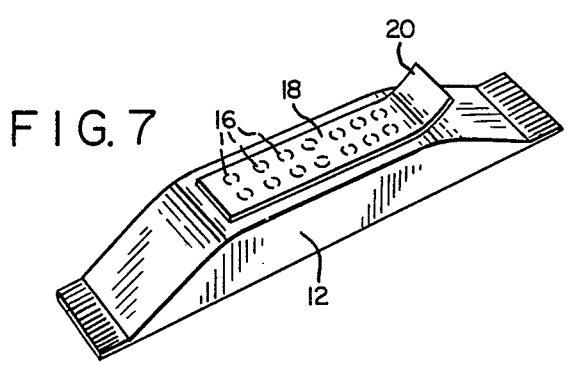
FIG. 7 is an isometric view of yet another form of a smoke producing device according to the present invention.
Figure 8:
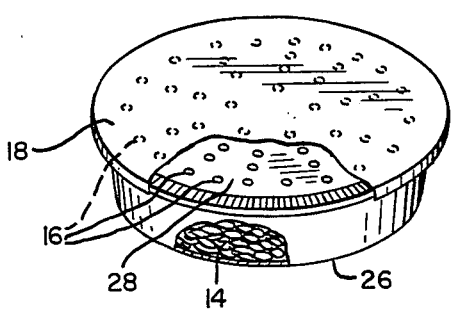
FIG. 8 is an isometric view of still another form of a smoke generating device according to the present invention.

Alternative forms for the present invention are shown in FIGS. 7 and 8. FIG. 7 is a construction akinato many candy bar wrappers in which the container wraps around the smoke producing material and has its ends crimped flat. FIG. 8 shows an aluminum cup 26 filled with a smoke generating material and covered with a perforated piece of foil 28 that is crimped to the lip of the cup. A combustible perforation cover 18 covers the perforations in foil 28.

Having described and illustrated the principles of my invention in a preferred embodiment and a few variations thereof, it should be apparent that the invention can be modified in arrangement and detail without departing from such principles. For example, container 12 can assume any of a number of shapes. Similarly, a number of variations can be made in the type of coverings applied to holes 16. Accordinqly, I claim as yy invention all modifications coming within the scope and spirit of the following claims and equivalents thereof.

I claim:

1. A smoke generator for use in a barbecue or the like, comprising:
   smoke producing material;
   noncombustible metal container means for containing the smoke producing material, said container means including a plurality of smoke exhaust holes through which smoke can escape the container means when the smoke producing material within the container means is heated to smoldering in a barbecue; and
   combustible cover means positioned on the outside of the metal container means for covering the smoke exhaust holes, whereby the smoke exhaust holes are covered until the smoke generator is used in the barbecue, at which time the combustible cover means combusts and is consumed to expose the smoke exhaust holes and to permit smoke produced by the smoldering of the smoke producing material within the container means to escape.

2. The smoke generator of claim 1 which the container means comprises aluminum foil rolled into a cylinder and with its ends crimped so as to enclose the smoke producing material.

3. The smoke generator of claim 2 the crimps at the end of the aluminum cylinder are twisted so as to provide a more air tight closure.

4. The smoke generator of claim 1 in which the cover means also serves to cover any gaps in the container means left during its fabrication through which the smoke producing material might communicate with the surrounding environment.

5. A smoke generator for use in a barbecue or the like comprising:
   metal container means for containing a smoke producing material, said container means including a plurality of smoke exhaust holes through which smoke can escape the container means when the smoke producing material within the container means is heated to smoldering in a barbecue; and
   manually removable cover means adhesively bonded to the outside of the metal container means for covering the smoke exhaust holes, whereby the smoke exhaust holes can be kept covered to limit exposure of the smoke producing material within the container means to the surrounding environment until it is desired to use the smoke generator, at which time the removable means can be removed to expose the smoke exhaust holes and to let smoke produced by the smoke producing material escape therethrough.

6. The smoke generator of claim 5 in which the removable cover means is substantially moisture impermeable, whereby moisture transfer through the smoke exhaust hole is prevented until the removable cover means is removed.

7. The smoke generator of claim 6 in which the removable cover means comprises paper impregnated with wax.

* * * * *